United States Patent
Liao et al.

(10) Patent No.: US 10,021,427 B2
(45) Date of Patent: Jul. 10, 2018

(54) IMAGE PROCESSING METHOD AND APPARATUS

(71) Applicant: Huawei Technologies Co., Ltd., Shenzhen (CN)

(72) Inventors: Guiming Liao, Shenzhen (CN); Gang Su, Hangzhou (CN); Changcai Lai, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 492 days.

(21) Appl. No.: 14/794,277

(22) Filed: Jul. 8, 2015

(65) Prior Publication Data

US 2015/0312596 A1    Oct. 29, 2015

Related U.S. Application Data

(63) Continuation of application No. PCT/CN2014/070130, filed on Jan. 4, 2014.

(30) Foreign Application Priority Data

Jun. 21, 2013    (CN) .......................... 2013 1 0250219

(51) Int. Cl.
  *H04N 7/12*    (2006.01)
  *H04N 19/86*    (2014.01)
  (Continued)

(52) U.S. Cl.
  CPC ........... *H04N 19/86* (2014.11); *H04N 19/117* (2014.11); *H04N 19/157* (2014.11);
  (Continued)

(58) Field of Classification Search
  CPC ........ H04N 17/00; H04N 17/26; H04N 19/00; H04N 19/82; H04N 19/86
  See application file for complete search history.

(56) References Cited

U.S. PATENT DOCUMENTS

| | | |
|---|---|---|
| 2012/0106622 A1 | 5/2012 | Huang et al. |
| 2013/0083844 A1 | 4/2013 | Chong et al. |

(Continued)

FOREIGN PATENT DOCUMENTS

| | | |
|---|---|---|
| CN | 102685478 A | 9/2012 |
| CN | 103024383 A | 4/2013 |

(Continued)

OTHER PUBLICATIONS

Foreign Communication From a Counterpart Application, Chinese Application No. 201310250219.2, Chinese Office Action dated Oct. 29, 2015, 5 pages.

(Continued)

*Primary Examiner* — Sathyanaraya V Perungavoor
*Assistant Examiner* — Patricia I Young
(74) *Attorney, Agent, or Firm* — Conley Rose, P.C.

(57) ABSTRACT

An image processing method and apparatus, the image processing method including receiving a first largest coding unit of an image, where the first largest coding unit is a currently received largest coding unit; determining a compensation parameter of the first largest coding unit; performing pixel compensation on at least one area of the first largest coding unit according to the compensation parameter of the first largest coding unit; and performing pixel compensation on at least one area, on which pixel compensation is not performed, of a second largest coding unit according to a compensation parameter of the second largest coding unit, where the second largest coding unit is a previously received largest coding unit adjacent to the first largest coding unit.

27 Claims, 6 Drawing Sheets

(51) Int. Cl.

| | | |
|---|---|---|
| *H04N 19/117* | (2014.01) | |
| *H04N 19/82* | (2014.01) | |
| *G09G 3/20* | (2006.01) | |
| *H04N 19/176* | (2014.01) | |
| *H04N 19/196* | (2014.01) | |
| *H04N 19/463* | (2014.01) | |
| *H04N 19/157* | (2014.01) | |
| *H04N 19/182* | (2014.01) | |

(52) U.S. Cl.
CPC ......... *H04N 19/176* (2014.11); *H04N 19/182* (2014.11); *H04N 19/196* (2014.11); *H04N 19/463* (2014.11); *H04N 19/82* (2014.11)

(56) References Cited

U.S. PATENT DOCUMENTS

| | | | |
|---|---|---|---|
| 2013/0188723 A1 | 7/2013 | Tanaka et al. | |
| 2014/0079117 A1 | 3/2014 | Yang et al. | |
| 2015/0326886 A1* | 11/2015 | Chen .................. | H04N 19/61 375/240.02 |

FOREIGN PATENT DOCUMENTS

| | | | |
|---|---|---|---|
| CN | 103051892 | A | 4/2013 |
| CN | 103125119 | A | 5/2013 |
| CN | 103155557 | A | 6/2013 |
| CN | 103338374 | A | 10/2013 |
| WO | 2012045269 | A1 | 4/2012 |
| WO | 2012092787 | A1 | 7/2012 |
| WO | 2012175195 | A1 | 12/2012 |
| WO | 2013053314 | A1 | 4/2013 |

OTHER PUBLICATIONS

Fu, C., et al., "Sample Adaptive Offset in the HEVC Standard," IEEE Transactions on Circuits and Systems for Video Technology, vol. 22, No. 12, Dec. 2012, pages 1755-1764.
Esenlik, S., et al., "Grid displacements for in-loop filtering," Joint Collaborative Team on Video Coding (JCT-VC) of ITU-T SG16 WP3 and ISO/IEC JTC1/SC29/WG11, JCTVC-F271, Jul. 14-22, 2011, 10 pages.
Foreign Communication Form A Counterpart Application, European Application No. 14813998.3, Extended European Search Report dated Feb. 16, 2016, 10 pages.
Partial English Translation and Abstract of Chinese Patent Application No. CN103338374A, Part 1, May 18, 2015, 7 pages.
Partial English Translation and Abstract of Chinese Patent Application No. CN103338374A, Part 2, May 18, 2015, 3 pages.
"Series H: Audiovisual and Multimedia Systems, Infrastructure of audiovisual services—Coding of moving video, High Efficiency Video Coding," ITU-T, H.265, Apr. 2013, 317 pages.
Foreign Communication From a Counterpart Application, PCT Application No. PCT/CN2014/070130, English Translation of International Search Report dated Apr. 3, 2014, 2 pages.
Foreign Communication From a Counterpart Application, PCT Application No. PCT/CN2014/070130, English Translation of Written Opinion dated Apr. 3, 2014, 6 pages.
Kim, I., et al., "High Efficiency Video Coding (HEVC) Test Model 10 (HM10) Encoder Description," JCTVC-L1002_v1, Jan. 14-23, 2013, 38 pages.
Foreign Communication From a Counterpart Application, European Application No. 14813998.3, Extended European Search Report dated Jan. 22, 2018, 10 pages.

* cited by examiner

IMAGE PROCESSING METHOD AND APPARATUS

CROSS-REFERENCE TO RELATED APPLICATION

This application is a continuation of International Application No. PCT/CN2014/070130, filed on Jan. 4, 2014, which claims priority to Chinese Patent Application No. 201310250219.2, filed on Jun. 21, 2013, both of which are hereby incorporated by reference in their entireties.

TECHNICAL FIELD

The present invention relates to the field of image processing technologies, and in particular, to an image processing method and apparatus.

BACKGROUND

The sample adaptive offset (SAO) technology is a coding technology newly added to the high efficiency video coding (HEVC) standard. A SAO compensator is placed behind a deblocking filter, and the SAO compensator determines a corresponding compensation parameter by classifying and counting pixels of a reconstructed image on which deblocking filtering is performed, and then performs pixel compensation on the image, thereby reducing distortion, improving a compression rate, and reducing bitstreams. The compensation parameter includes a sub-band offset compensation value, an edge offset compensation value, and the like. The compensation parameter indicates a SAO compensation method that needs to be used by a largest coding unit, including sub-band offset compensation, edge offset compensation, needing no compensation, and the like.

In the prior art, for an application at a largest coding unit (LCU) level in the HEVC standard, when the SAO compensator determines that edge offset compensation needs to be performed on a current LCU, pixel compensation needs to be performed on the entire current LCU by using pixels of LCUs that surround and are adjacent to the current LCU (including LCUs above, below, on the left of, on the right of, on the upper right of, on the lower right of, on the upper left of, and on the lower left of the current LCU). Therefore, pixel compensation cannot be performed on the current LCU until the LCU on the lower right of a currently received LCU is received.

Therefore, compared with the deblocking filter placed before the SAO compensator, the SAO compensator has a latency of more than one LCU row, and this latency is great, which cannot meet a highly time sensitive scenario. In addition, because compared with the deblocking filter, the SAO compensator has a latency of more than one LCU row, the SAO compensator further needs to buffer a received LCU on which pixel compensation is not performed. If an LCU has a size of N*N pixels, and a width of an image is X pixels, where X≥N and both X and N are positive integers, N*X+2*N*N pixels need to be buffered. Therefore, an amount of data that needs to be buffered is large, and occupied resources are substantial, causing an increase of costs.

SUMMARY

In view of this, the present invention provides an image processing method and apparatus, which can perform, without latency, pixel compensation processing immediately after an LCU is received, and can effectively reduce the amount of buffered data.

According to a first aspect, the present invention provides an image processing method, where each largest coding unit includes at least two areas, and the method includes receiving a first largest coding unit of an image, where the first largest coding unit is a currently received largest coding unit; determining a compensation parameter of the first largest coding unit; performing pixel compensation on at least one area of the first largest coding unit according to the compensation parameter of the first largest coding unit; and performing pixel compensation on at least one area, on which pixel compensation is not performed, of a second largest coding unit according to a compensation parameter of the second largest coding unit, where the second largest coding unit is a previously received largest coding unit adjacent to the first largest coding unit.

In a first possible implementation manner of the first aspect, the determining a compensation parameter of the first largest coding unit is determining the compensation parameter of the first largest coding unit according to pixels of the first largest coding unit; or, determining the compensation parameter of the first largest coding unit according to pixels of the second largest coding unit and pixels of the first largest coding unit.

With reference to the first aspect or the first possible implementation manner of the first aspect, in a second possible implementation manner, after the determining a compensation parameter of the first largest coding unit, the method further includes storing the compensation parameter of the first largest coding unit, where the compensation parameter is used for pixel compensation afterwards on an area, on which pixel compensation is not performed, in the first largest coding unit.

With reference to the first aspect, the first possible implementation manner of the first aspect, or the second possible implementation manner of the first aspect, in a third possible implementation manner, the performing pixel compensation on at least one area of the first largest coding unit according to the compensation parameter of the first largest coding unit is performing pixel compensation on at least one area of the first largest coding unit according to the compensation parameter of the first largest coding unit by using the pixels of the first largest coding unit; or, performing pixel compensation on at least one area of the first largest coding unit according to the compensation parameter of the first largest coding unit by using the pixels of the first largest coding unit and the pixels of the second largest coding unit.

With reference to the first aspect, the first possible implementation manner of the first aspect, the second possible implementation manner of the first aspect, or the third possible implementation manner of the first aspect, in a fourth possible implementation manner, the performing pixel compensation on at least one area, on which pixel compensation is not performed, of a second largest coding unit according to a compensation parameter of the second largest coding unit is performing pixel compensation on at least one area, on which pixel compensation is not performed, of the second largest coding unit according to the compensation parameter of the second largest coding unit by using the pixels of the second largest coding unit; or, performing pixel compensation on at least one area, on which pixel compensation is not performed, of the second largest coding unit according to the compensation parameter of the second largest coding unit by using the pixels of the second largest coding unit and pixels of a received largest coding unit adjacent to the second largest coding unit.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the image is an image on which deblocking filtering is not performed or an image on which deblocking filtering is performed.

According to a second aspect, the present invention provides an image processing apparatus, where each largest coding unit includes at least two areas, and the apparatus includes a receiving unit configured to receive a first largest coding unit of an image, where the first largest coding unit is a currently received largest coding unit; a determining unit configured to determine a compensation parameter of the first largest coding unit; and a compensation unit configured to perform pixel compensation on at least one area of the first largest coding unit according to the compensation parameter of the first largest coding unit, where the compensation unit is further configured to perform pixel compensation on at least one area, on which pixel compensation is not performed, of a second largest coding unit according to a compensation parameter of the second largest coding unit, where the second largest coding unit is a previously received largest coding unit adjacent to the first largest coding unit.

In a first possible implementation manner of the second aspect, the determining unit is configured to determine the compensation parameter of the first largest coding unit according to pixels of the first largest coding unit; or, determine the compensation parameter of the first largest coding unit according to pixels of the second largest coding unit and pixels of the first largest coding unit.

With reference to the second aspect or the first possible implementation manner of the second aspect, in a second possible implementation manner, the apparatus further includes a storage unit configured to store the compensation parameter of the first largest coding unit, where the compensation parameter is used for pixel compensation afterwards on an area, on which pixel compensation is not performed, in the first largest coding unit.

With reference to the second aspect, the first possible implementation manner of the second aspect, or the second possible implementation manner of the second aspect, in a third possible implementation manner, the compensation unit is configured to perform pixel compensation on at least one area of the first largest coding unit according to the compensation parameter of the first largest coding unit by using the pixels of the first largest coding unit; or, perform pixel compensation on at least one area of the first largest coding unit according to the compensation parameter of the first largest coding unit by using the pixels of the first largest coding unit and the pixels of the second largest coding unit.

With reference to the second aspect, the first possible implementation manner of the second aspect, the second possible implementation manner of the second aspect, or the third possible implementation manner of the second aspect, in a fourth possible implementation manner, the compensation unit is configured to perform pixel compensation on at least one area, on which pixel compensation is not performed, of the second largest coding unit according to the compensation parameter of the second largest coding unit by using the pixels of the second largest coding unit; or, perform pixel compensation on at least one area, on which pixel compensation is not performed, of the second largest coding unit according to the compensation parameter of the second largest coding unit by using the pixels of the second largest coding unit and pixels of a received largest coding unit adjacent to the second largest coding unit.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, the image is an image on which deblocking filtering is not performed or an image on which deblocking filtering is performed.

According to the foregoing solutions, because each LCU of an image includes at least two areas, and pixel compensation is separately performed on at least one area of a current LCU and at least one area, on which pixel compensation is not performed, of a previously received LCU adjacent to the current LCU. Therefore, after a compensation parameter of the current LCU is determined, pixel compensation can be directly performed, without a latency, on at least one area of the current LCU by using pixels of the current LCU and pixels of the received LCU adjacent to the current LCU; and only an area, on which pixel compensation is not performed, in the received LCU needs to be buffered, which can effectively reduce the amount of buffered data.

DESCRIPTION OF EMBODIMENTS

To make the objectives, technical solutions, and advantages of the present invention clearer, the following further describes the present invention in detail with reference to the accompanying drawings. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
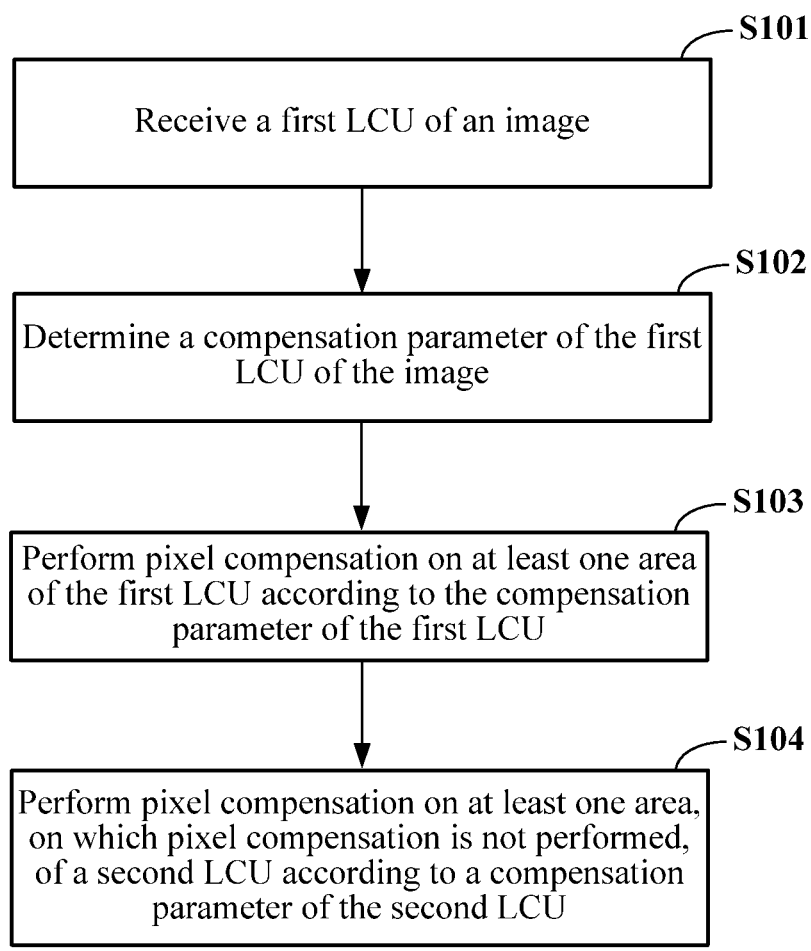
FIG. 1 is a schematic flowchart of an image processing method according to Embodiment 1 of the present invention.

An image processing method provided in Embodiment 1 of the present invention is described below in detail by using FIG. 1 as an example. FIG. 1 is a schematic flowchart of the image processing method according to Embodiment 1 of the present invention. The image processing method is executed by a sample adaptive offset (SAO) compensator. As shown in FIG. 1, the image processing method includes the following steps:

Step S101: Receive a first largest coding unit (LCU) of an image.

The first LCU is an LCU currently received by the SAO compensator. The SAO compensator receives one LCU at every moment, and each LCU includes at least two areas.

Optionally, the image is an image on which deblocking filtering is not performed or an image on which deblocking filtering is performed.

Step S102: Determine a compensation parameter of the first LCU of the image.

The compensation parameter includes a sub-band offset compensation value, an edge offset compensation value, and the like. When it is determined that the LCU does not need sub-band offset compensation or edge offset compensation, the compensation parameter is 0. The SAO compensator needs to determine whether sub-band offset compensation or edge offset compensation needs to be performed on the first LCU. When it is determined whether sub-band offset compensation is needed, the determining may be performed according to only pixels of the first LCU. If sub-band offset compensation needs to be performed, the sub-band offset compensation value is calculated. When it is determined whether edge offset compensation is needed, the determining is performed according to edge pixels of the first LCU, or according to edge pixels of the first LCU and pixels of a second LCU. If edge offset compensation needs to be performed, the edge offset compensation value is calculated. Finally, the compensation parameter of the first LCU is determined.

The second LCU is a previously received LCU adjacent to the first LCU. The second LCU includes one, two, or three LCUs.

In addition, the SAO compensator stores the compensation parameter of the first LCU, so that the compensation parameter is used when pixel compensation is subsequently performed on an area, on which pixel compensation is not performed, of the first LCU.

Step S103: Perform pixel compensation on at least one area of the first LCU according to the compensation parameter of the first LCU.

If the determined compensation parameter of the first LCU is a sub-band offset compensation parameter, the SAO compensator performs pixel compensation on at least one area of the first LCU according to the sub-band offset compensation parameter of the first LCU by using the pixels of the first LCU. If the determined compensation parameter of the first LCU is an edge offset compensation parameter, the SAO compensator performs edge offset compensation on at least one area of the first LCU according to the edge offset compensation parameter of the first LCU by using the pixels of the first LCU and the pixels of the second LCU.

Step S104: Perform pixel compensation on at least one area, on which pixel compensation is not performed, of a second LCU according to a compensation parameter of the second LCU.

When the compensation parameter of the second LCU is determined, because the compensation parameter of the second LCU is determined when the second LCU is previously received, and the compensation parameter of the second LCU is stored in the SAO compensator, the stored compensation parameter of the second LCU can be directly used when pixel compensation is performed on the area, on which pixel compensation is not performed, of the second LCU.

If the stored compensation parameter of the second LCU is the sub-band offset compensation parameter, the SAO compensator performs sub-band offset compensation on at least one area, on which pixel compensation is not performed, of the second LCU according to the sub-band offset compensation parameter of the second LCU by using the pixels of the second LCU. If the stored compensation parameter of the second LCU is the edge offset compensation parameter, the SAO compensator performs edge offset compensation on at least one area, on which pixel compensation is not performed, of the second LCU according to the edge offset compensation parameter of the second LCU by using the pixels of the second LCU and pixels of a received LCU adjacent to the second LCU.

It should be noted that, step S103 and step S104 may be performed in any order, which is not limited in Embodiment 1 of the present invention.

According to the image processing method provided in Embodiment 1 of the present invention, because each LCU of an image includes at least two areas, an SAO compensator separately performs pixel compensation on at least one area of a current LCU and at least one area, on which pixel compensation is not performed, of a previously received LCU adjacent to the current LCU. Therefore, after a compensation parameter of the current LCU is determined, the SAO compensator can directly perform, without a latency, pixel compensation on at least one area of the current LCU by using pixels of the current LCU and pixels of the received LCU adjacent to the current LCU; and only an area, on which pixel compensation is not performed, in the received LCU needs to be buffered, which can effectively reduce the amount of buffered data.

Figure 2:
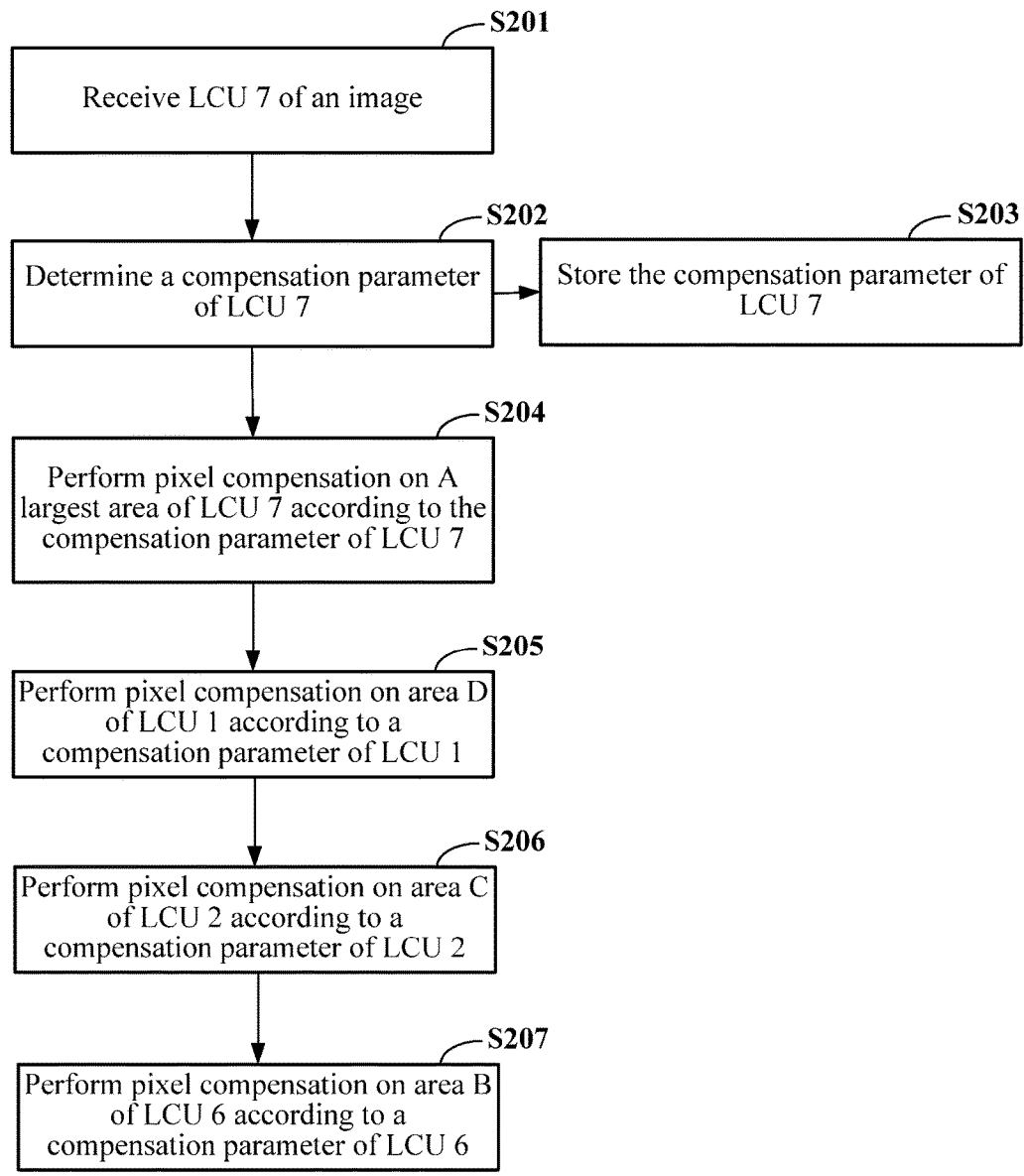
FIG. 2 is a schematic flowchart of an image processing method according to Embodiment 2 of the present invention.
Figure 3:
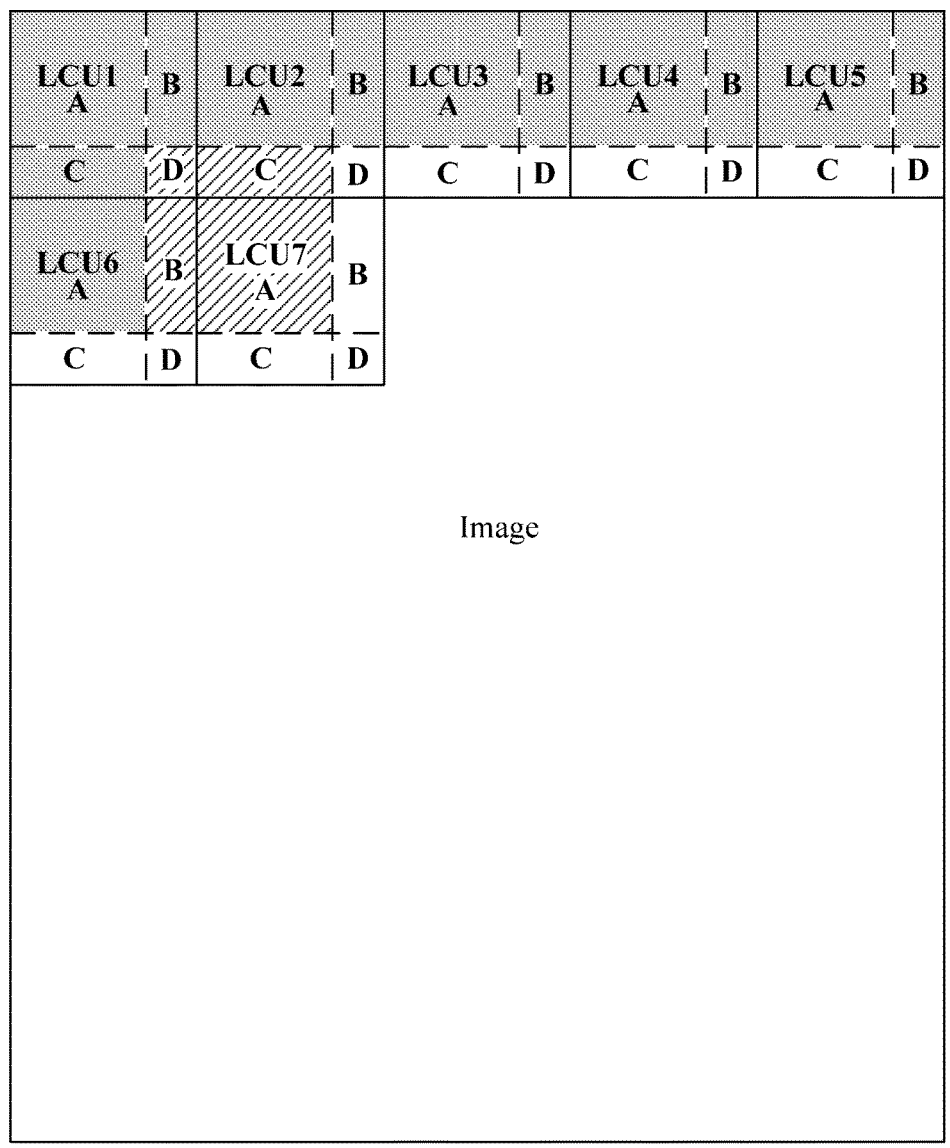
FIG. 3 is a schematic diagram of an image on which pixel compensation processing is performed according to Embodiment 2 of the present invention.

An image processing method provided in Embodiment 2 of the present invention is described below in detail by using FIG. 2 and FIG. 3 as an example. FIG. 2 is a schematic flowchart of the image processing method according to Embodiment 2 of the present invention. FIG. 3 is a schematic diagram of an image on which pixel compensation processing is performed according to Embodiment 2 of the present invention. As shown in FIG. 3, each solid line square represents one LCU, and each LCU includes four areas. Grey parts indicate areas on which pixel compensation is performed, blank parts indicate areas on which pixel compensation is not performed, and slashed parts indicate areas on which pixel compensation is currently being performed, that is, Embodiment 2 of the present invention is described by using an example that LCU 7 is currently received.

The image processing method is executed by an SAO compensator. As shown in FIG. 2, the image processing method includes the following steps.

Step S201: Receive LCU 7 of an image.

The SAO compensator receives one LCU at every moment, and each LCU includes four areas.

An area division manner of each LCU is shown in FIG. 3, and each LCU includes four identical areas, which are A, B, C, and D. One LCU has a size of N*N pixels, area A has a size of M*K pixels, area B has a size of I*K pixels, area C has a size of M*J pixels, and area D has a size of I*J pixels, where N=M+I=K+J, and N, M, K, I, and J are all positive integers.

It may be understood that, an area included by each LCU may be in any size and of any shape, which is not limited by the area division manner provided in this embodiment.

Optionally, the image is an image on which deblocking filtering is not performed or an image on which deblocking filtering is performed.

Step S202: Determine a compensation parameter of LCU 7.

The compensation parameter includes a sub-band offset compensation value, an edge offset compensation value, and the like. When it is determined that the LCU does not need sub-band offset compensation or edge offset compensation, the compensation parameter is 0.

The SAO compensator needs to determine whether sub-band offset compensation or edge offset compensation needs to be performed on LCU 7. When it is determined whether sub-band offset compensation is needed, the determining is performed by using only pixel of LCU 7. If sub-band offset compensation needs to be performed, a sub-band offset compensation value is calculated. When it is determined whether edge offset compensation is needed, the determining is performed by using pixels on a lower edge of and on a right edge of LCU 7 and pixels of LCU 1, LCU 2, LCU 3, and LCU 6. If edge offset compensation needs to be performed, an edge offset compensation value is calculated. Finally, the compensation parameter of LCU 7 is determined.

Step S203: Store the compensation parameter of LCU 7.

The SAO compensator stores the compensation parameter of LCU 7, so that the compensation parameter is used when pixel compensation is subsequently performed on an area, on which pixel compensation is not performed, of LCU 7.

Step S204: Perform pixel compensation on a largest area of LCU 7 according to the compensation parameter of LCU 7.

Because LCU 7 is an LCU in an intermediate area of the image, currently, pixel compensation only needs to be performed on the largest area (that is, area A) of LCU 7.

If the determined compensation parameter of LCU 7 is a sub-band offset compensation parameter, the SAO compensator performs sub-band offset compensation on area A of LCU 7 according to the sub-band offset compensation parameter of LCU 7 by using pixels of LCU 7. If the determined compensation parameter of LCU 7 is an edge offset compensation parameter, the SAO compensator performs edge offset compensation on area A of LCU 7 according to the edge offset compensation parameter of LCU 7 by using the pixels of LCU 7, LCU 1, LCU 2, and LCU 6.

Step S205: Perform pixel compensation on area D of LCU 1 according to a compensation parameter of LCU 1.

LCU 1 is a previously received LCU. Because the compensation parameter of LCU 1 is determined when LCU 1 is previously received, the SAO compensator has previously stored the compensation parameter of LCU 1, and the SAO compensator directly performs pixel compensation on area D of LCU 1 according to the stored compensation parameter of LCU 1.

If the stored compensation parameter of LCU 1 is the sub-band offset compensation parameter, the SAO compensator performs sub-band offset compensation on area D of LCU 1 according to the sub-band offset compensation parameter of LCU 1 by using the pixels of LCU 1. If the stored compensation parameter of LCU 1 is the edge offset compensation parameter, the SAO compensator performs edge offset compensation on area D of LCU 1 according to the edge offset compensation parameter of LCU 1 by using area A, area B, and area C of LCU 1, and the pixels of LCU 2, LCU 6, and LCU 7.

Step S206: Perform pixel compensation on area C of LCU 2 according to a compensation parameter of LCU 2.

LCU 2 is a previously received LCU. Because the compensation parameter of LCU 2 is determined when the LCU 2 is previously received, the SAO compensator has previously stored the compensation parameter of LCU 2, and the SAO compensator directly performs pixel compensation on area C of LCU 2 according to the stored compensation parameter of LCU 2.

If the stored compensation parameter of LCU 2 is the sub-band offset compensation parameter, the SAO compensator performs sub-band offset compensation on area C of LCU 2 according to the sub-band offset compensation parameter of LCU 2 by using the pixels of LCU 2. If the stored compensation parameter of LCU 2 is the edge offset compensation parameter, the SAO compensator performs edge offset compensation on area C of LCU 2 according to the edge offset compensation parameter of LCU 2 by using area A, area B, and area D of LCU 2, and the pixels of LCU 1, LCU 6, and LCU 7.

Step S207: Perform pixel compensation on area B of LCU 6 according to a compensation parameter of LCU 6.

LCU 6 is a previously received LCU. Because the compensation parameter of LCU 6 is determined when LCU 6 is previously received, the SAO compensator has previously stored the compensation parameter of LCU 6, and the SAO compensator directly performs pixel compensation on area B of LCU 6 according to the stored compensation parameter of LCU 6.

If the stored compensation parameter of LCU 6 is the sub-band offset compensation parameter, the SAO compensator performs sub-band offset compensation on area B of LCU 6 according to the sub-band offset compensation parameter of LCU 6 by using the pixels of LCU 6. If the stored compensation parameter of LCU 6 is the edge offset compensation parameter, the SAO compensator performs edge offset compensation on area B of LCU 6 according to the edge offset compensation parameter of LCU 6 by using area A, area C, and area D of LCU 6, and the pixels of LCU 1, LCU 2, and LCU 7.

It should be noted that, for an LCU on an edge of the image, if a determined compensation parameter of a processed LCU is the sub-band offset compensation parameter, sub-band offset compensation needs to be performed on edge pixels of the LCU; if the determined compensation parameter of the LCU is the edge offset compensation parameter, specific analyses need to be made: 1) it is determined that 0-degree edge offset compensation needs to be performed on the LCU, and if the LCU is on the left-right edge of the image, pixels on the left-right edge of the image in the LCU do not need compensation; 2) it is determined that 90-degree edge offset compensation needs to be performed on the LCU, and if the LCU is on the upper-lower edge of the image, pixels on the upper-lower edge of the image in the LCU do not need compensation; and 3) it is determined that 45-degree or 135-degree edge offset compensation needs to be performed on the LCU, and if the LCU is on an edge of the image, no pixels on the edge of the image in the LCU need compensation.

It should be further noted that, step S204 to step S207 may be performed in any order, which is not limited in Embodiment 2 of the present invention.

It should be further noted that, if a current LCU is the first LCU of the image, but is not in the last column of LCUs of the image, pixel compensation is only performed on area A of the current LCU; if the current LCU is the last LCU in the first row of the image, but is not the last LCU of the image or the first LCU of the image, pixel compensation is performed on area A and area B of the current LCU and area B of a left LCU; if the current LCU is an LCU in the first row of LCUs of the image except the first LCU and the last LCU, but is not in the last row of LCUs of the image, pixel compensation is performed on area A of the current LCU and area B of the left LCU; if the current LCU is an LCU in the first column of LCUs of the image except the first LCU and the last LCU, but does not belong to the last column of LCUs of the image, pixel compensation is performed on area A of the current LCU and area C of an upper LCU; if the current LCU is an LCU in the last column of LCUs of the image except the first LCU and the last LCU, but does not belong to the first column of LCUs of the image, when step S204 to step S207 are correspondingly performed, pixel compensation is also performed on area B of the current LCU and area D of the upper LCU; if the current LCU is the first LCU in the last row of the image, but is not the first LCU of the image or the last LCU of the image, pixel compensation is performed on area A and area C of the current LCU and area C of the upper LCU; if the current LCU is an LCU in the last row of LCUs of the image except the first LCU and the last LCU, but does not belong to the first row of LCUs, when step S204 to step S207 are correspondingly performed, pixel compensation is also performed on area C of the current LCU and area D of the left LCU; if the current LCU is the last LCU of the image, but is not in the first column of LCUs of the image or the first row of LCUs of the image, when step S204 to step S207 are correspondingly performed, pixel compensation is also performed on area B, area C, and area D of the current LCU, area D of the upper LCU, and area D of the left LCU, so as to complete pixel compensation for the entire image.

Each LCU of an image is divided into four areas, and pixel compensation is separately performed on at least one area of the current LCU and at least one area, on which pixel compensation is not performed, of one, two, or three previously received LCUs adjacent to the current LCU. Therefore, after a compensation parameter of the current LCU is determined, pixel compensation can be directly performed, without a latency, on at least one area of the current LCU by using pixels of the current LCU and pixels of the received LCU adjacent to the current LCU; and only an area, on which pixel compensation is not performed, in the received LCU needs to be buffered, which can effectively reduce the amount of buffered data.

As shown in FIG. 3, after pixel compensation is performed on area A of LCU 7, area D of LCU 1, area C of LCU 2, and area B of LCU 6, the SAO compensator needs to buffer an area, on which pixel compensation is not performed, in each LCU, that is, white areas of each LCU in FIG. 3. If the image has a width of X pixels, where X≥N, and X is a positive integer, (J+1)*X+(I+1)*N pixels need to be buffered. Compared with the prior art, this is equivalent that a reduced proportion a of the amount of data that needs to be buffered is:

$$a = ((N^*X + 2^*N^*N) - ((J+1)^*X + (I+1)^*N))/(N^*X + 2^*N^*N)$$
$$= ((N-J-1)^*X + (2^*N-I-1)^*N)/(N^*X + 2^*N^*N)$$

For a general application, when N=64, I=5, and J=4, a >92.18%, that is, compared with the prior art, more than 90% of the amount of the buffered data of the SAO compensator can be reduced by using the image processing method provided in Embodiment 2 of the present invention.

Figure 4:
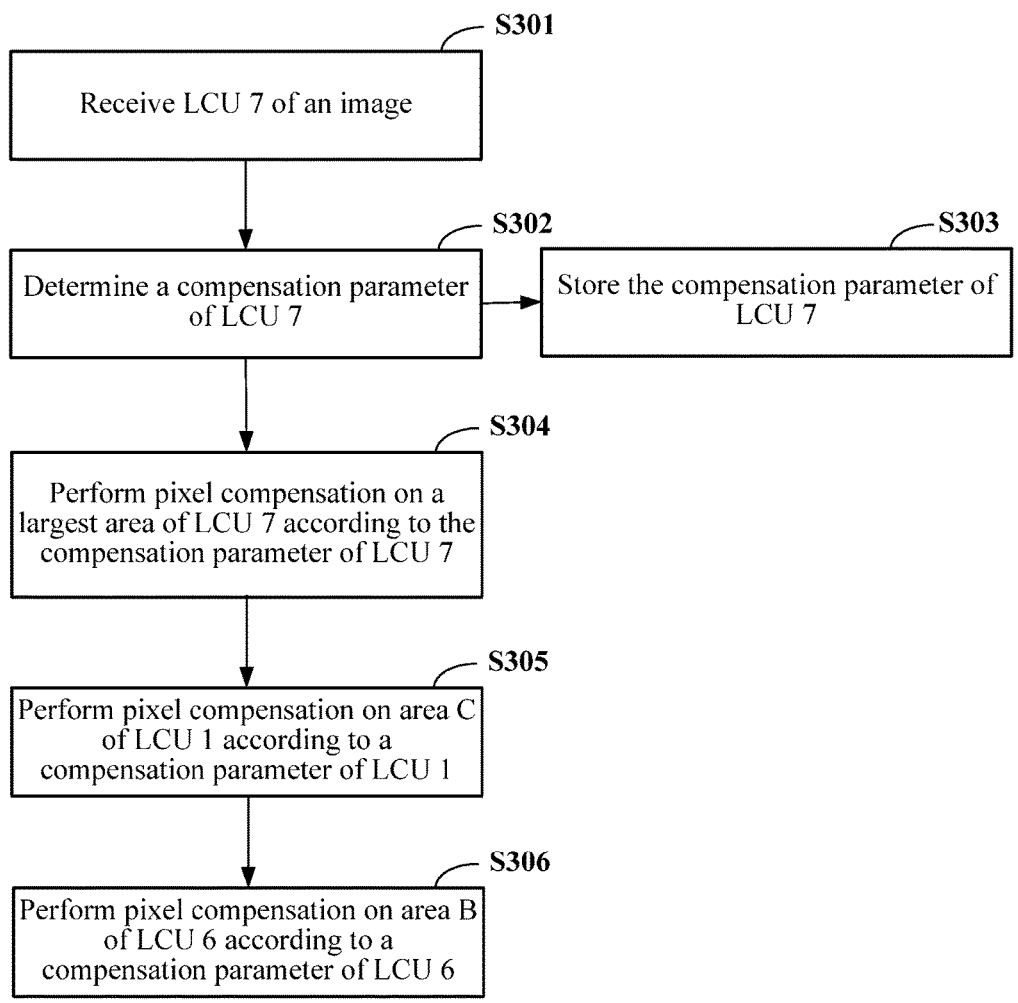
FIG. 4 is a schematic flowchart of an image processing method according to Embodiment 3 of the present invention.
Figure 5:
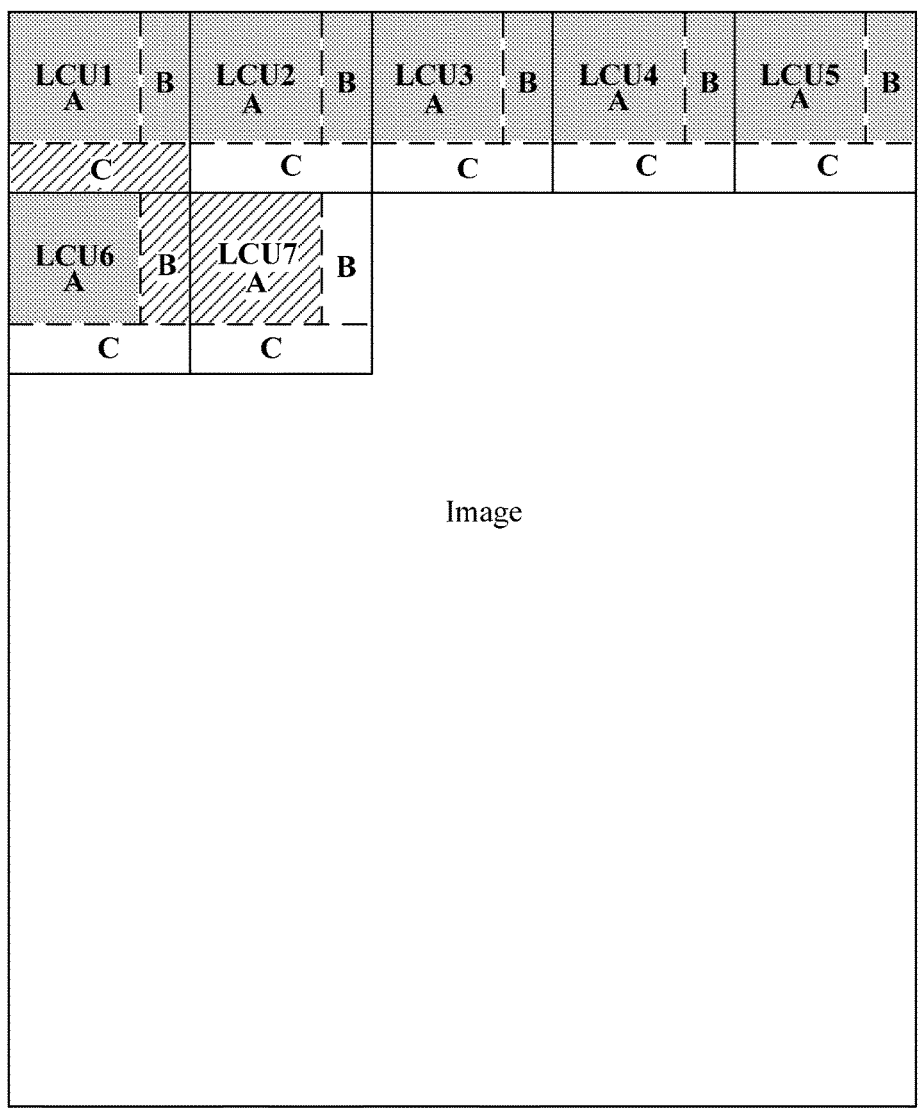
FIG. 5 is a schematic diagram of an image on which pixel compensation processing is performed according to Embodiment 3 of the present invention.

An image processing method provided in Embodiment 3 of the present invention is described in detail by using FIG. 4 and FIG. 5 as an example. FIG. 4 is a schematic flowchart of the image processing method according to Embodiment 3 of the present invention. FIG. 5 is a schematic diagram of an image on which pixel compensation processing is performed according to Embodiment 3 of the present invention. As shown in FIG. 5, each solid line square represents one LCU, and each LCU includes three areas. Grey parts indicate areas on which pixel compensation is performed, blank parts indicate areas on which pixel compensation is not performed, and slashed parts indicate areas on which pixel compensation is currently being performed, that is, Embodiment 3 of the present invention is described by using an example that LCU 7 is currently received.

The image processing method is executed by a SAO compensator. As shown in FIG. 4, the image processing method includes the following steps.

Step S301: Receive LCU 7 of an image.

The SAO compensator receives one LCU at every moment, and each LCU includes three areas.

An area division manner of each LCU is shown in FIG. 5, and each LCU includes three identical areas, which are A, B, and C. One LCU has a size of N*N pixels, area A has a size of M*K pixels, the B area has a size of I*K pixels, and area C has a size of N*J pixels, where N=M+I=K+J, and N, K, I, and J are all positive integers.

It may be understood that, an area included by each LCU may be in any size and of any shape, which is not limited by the area division manner provided in this embodiment.

Optionally, the image is a reconstructed image or a reconstructed image on which deblocking filtering is performed. The reconstructed image refers to an image obtained by adding prediction data of the image to residual data.

Step S302: Determine a compensation parameter of LCU 7.

The compensation parameter includes: a sub-band offset compensation value, an edge offset compensation value, and the like. When it is determined that the LCU does not need sub-band offset compensation or edge offset compensation, the compensation parameter is 0.

The SAO compensator needs to determine whether sub-band offset compensation or edge offset compensation needs to be performed on LCU 7. When it is determined whether sub-band offset compensation is needed, the determining is performed by using only pixels of LCU 7. If sub-band offset compensation needs to be performed, a sub-band offset compensation value is calculated. When it is determined whether edge offset compensation is needed, the determining is performed by using pixels on a lower edge of and on a right edge of LCU 7 and pixels of LCU 1, LCU 2, LCU 3, and LCU 6. If edge offset compensation needs to be performed, an edge offset compensation value is calculated. Finally, the compensation parameter of LCU 7 is determined.

Step S303: Store the compensation parameter of LCU 7.

The SAO compensator stores the compensation parameter of LCU 7, so that the compensation parameter is used when pixel compensation is subsequently performed on an area, on which pixel compensation is not performed, of LCU 7.

Step S304: Perform pixel compensation on a largest area of LCU 7 according to the compensation parameter of LCU 7.

Because LCU 7 is an LCU in an intermediate area of the image, currently, pixel compensation only needs to be performed on the largest area (that is, area A) of LCU 7.

If the determined compensation parameter of LCU 7 is a sub-band offset compensation parameter, the SAO compensator performs sub-band offset compensation on area A of LCU 7 according to the sub-band offset compensation parameter of LCU 7 by using the pixels of LCU 7. If the determined compensation parameter of LCU 7 is an edge offset compensation parameter, the SAO compensator performs edge offset compensation on area A of LCU 7 according to the edge offset compensation parameter of LCU 7 by using the pixels of LCU 7, LCU 1, LCU 2, and LCU 6.

Step S305: Perform pixel compensation on area C of LCU 1 according to a compensation parameter of LCU 1.

LCU 1 is a previously received LCU. Because the compensation parameter of LCU 1 is determined when LCU 1 is previously received, the SAO compensator has previously stored the compensation parameter of LCU 1, and the SAO compensator directly performs pixel compensation on area C of LCU 1 according to the stored compensation parameter of LCU 1.

If the stored compensation parameter of LCU 1 is the sub-band offset compensation parameter, the SAO compensator performs sub-band offset compensation on area C of LCU 1 according to the sub-band offset compensation parameter of LCU 1 by using pixels of LCU 1. If the stored compensation parameter of LCU 1 is the edge offset compensation parameter, the SAO compensator performs edge offset compensation on area C of LCU 1 according to the edge offset compensation parameter of LCU 1 by using area A and area B of LCU 1, and the pixels of LCU 2, LCU 6, and LCU 7.

It should be noted that, because the left side of area C of LCU 1 is an edge of the image, when pixel compensation is performed on area C of LCU 1, if it is determined that the compensation parameter of LCU 1 is the edge offset compensation parameter, and when edge offset compensation needs to be performed by using left and right pixels adjacent to each other, edge offset compensation does not need to be performed on the leftmost column of pixels of LCU 1.

It should be noted that, for an LCU on an edge of the image, if a determined compensation parameter of a processed LCU is the sub-band offset compensation parameter, sub-band offset compensation needs to be performed on edge pixels of the LCU; if the determined compensation parameter of the LCU is the edge offset compensation parameter, specific analyses need to be made: 1) it is determined that 0-degree edge offset compensation needs to be performed on the LCU, and if the LCU is on the left-right edge of the image, pixels on the left-right edge of the image in the LCU do not need compensation; 2) it is determined that 90-degree edge offset compensation needs to be performed on the LCU, and if the LCU is on the upper-lower edge of the image, pixels on the upper-lower edge of the image in the LCU do not need compensation; and 3) it is determined that 45-degree or 135-degree edge offset compensation needs to be performed on the LCU, and if the LCU is on an edge of the image, no pixels on the edge of the image in the LCU need compensation.

Step S306: Perform pixel compensation on area B of LCU 6 according to a compensation parameter of LCU 6.

LCU 6 is a previously received LCU. Because the compensation parameter of LCU 6 is determined when LCU 6 is previously received, the SAO compensator has previously stored the compensation parameter of LCU 6, and the SAO compensator directly performs pixel compensation on area B of LCU 6 according to the stored compensation parameter of LCU 6.

If the stored compensation parameter of LCU 6 is the sub-band offset compensation parameter, the SAO compensator performs sub-band offset compensation on area B of LCU 6 according to the sub-band offset compensation parameter of LCU 6 by using pixels of LCU 6. If the stored compensation parameter of LCU 6 is the edge offset compensation parameter, the SAO compensator performs edge offset compensation on area B of LCU 6 according to the edge offset compensation parameter of LCU 6 by using area A and area B of LCU 6, and the pixels of LCU 1, LCU 2, and LCU 7.

It should be noted that, step S304 to step S306 may be performed in any order, which is not limited in Embodiment 3 of the present invention.

It should be further noted that, if a current LCU is in the first column of LCUs of the image, but is not in the last column of LCUs of the image, pixel compensation is only performed on area A of the current LCU; if the current LCU is the last LCU in the first row of the image, but not the last LCU of the image or the first LCU of the image, pixel compensation is performed on area A and area B of the current LCU and area B of a left LCU; if the current LCU is an LCU in the first row of LCUs of the image except the first LCU and the last LCU, but is not in the last row of LCUs of the image, pixel compensation is performed on area A of the current LCU and area B of the left LCU; if the current LCU is an LCU in the last column of LCUs of the image except the first LCU and the last LCU, but does not belong to the first column of LCUs of the image, when step S304 to step S306 are correspondingly performed, pixel compensation is also performed on area B of the current LCU and area C of an upper LCU; if the current LCU is an LCU in the last row of LCUs of the image except the first LCU and the last LCU, but does not belong to the first row of LCUs, when step S304 to step S306 are correspondingly performed, pixel compensation is also performed on area C of the left LCU; if the current LCU is the last LCU of the image, but is not in the first column of LCUs of the image or in the first row of LCUs of the image, when step S304 to step S306 are correspondingly performed, pixel compensation is also performed on area B and area C of the current LCU, area C of the upper LCU, and area C of the left LCU, so as to complete pixel compensation on the entire image.

Each LCU of an image is divided into three areas, and pixel compensation is separately performed on at least one area of the current LCU and at least one area, on which pixel compensation is not performed, of one, two, or three previously received LCUs adjacent to the current LCU. Therefore, after a compensation parameter of the current LCU is determined, pixel compensation can be directly performed, without a latency, on at least one area of the current LCU by using internal pixels of the current LCU and pixels of the received LCU adjacent to the current LCU; and only an area, on which pixel compensation is not performed, in the received LCU needs to be buffered, which can effectively reduce the amount of buffered data.

As shown in FIG. 5, after pixel compensation is performed on area A of LCU 7, area D of LCU 1, area C of LCU 2, and area B of LCU 6, the SAO compensator needs to buffer an area, on which pixel compensation is not performed, in each LCU, that is, white areas of each LCU in FIG. 5. If the image has a width of X pixels, where X≥N, and X is a positive integer, (J+1)*(X+N)+(I+1)*N pixels need to be buffered. Compared with the prior art, this is equivalent that a reduced proportion a of the amount of data that needs to be buffered is:

$$a = ((N^*X + 2^*N^*N) - ((J+1)^*(X+N) + (I+1)^*N))/(N^*X + 2^*N^*N)$$
$$= ((N - J - 1)^*X + (2^*N - I - J - 2)^*N)/(N^*X + 2^*N^*N)$$

For a general application, when N=64, I=5, and J=4, a >91.4%, that is, compared with the prior art, more than 90% of the amount of the buffered data of the SAO compensator can be reduced by using the image processing method provided in Embodiment 3 of the present invention.

Figure 6:
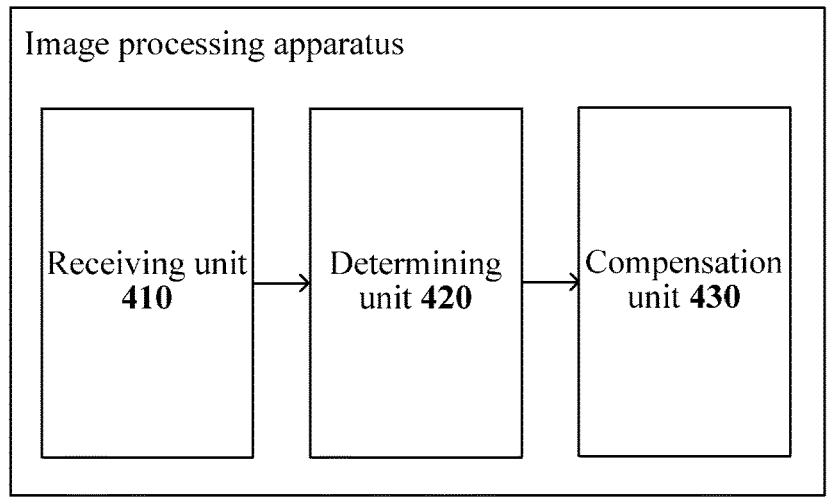
FIG. 6 is a schematic structural diagram of an image processing apparatus according to Embodiment 4 of the present invention.

An image processing apparatus provided in Embodiment 4 of the present invention is described below in detail by using FIG. 6 as an example. FIG. 6 is a schematic structural diagram of the image processing apparatus according to Embodiment 4 of the present invention. The image processing apparatus is applied to an SAO compensator, and is configured to implement the image processing method provided in Embodiment 1, Embodiment 2, and Embodiment 3 of the present invention.

As shown in FIG. 6, the image processing apparatus includes a receiving unit 410, a determining unit 420, and a compensation unit 430.

The receiving unit 410 is configured to receive a first LCU of an image.

The first LCU is an LCU currently received by the receiving unit 410. The receiving unit 410 receives one LCU at every moment, and each LCU includes at least two areas.

Optionally, the image is an image on which deblocking filtering is not performed or an image on which deblocking filtering is performed.

The determining unit 420 is configured to determine a compensation parameter of the first LCU of the image.

The compensation parameter includes: a sub-band offset compensation value, an edge offset compensation value, and the like. When it is determined that the LCU does not need sub-band offset compensation or edge offset compensation, the compensation parameter is 0.

The determining unit 420 needs to determine whether sub-band offset compensation or edge offset compensation needs to be performed on the first LCU. When it is determined whether sub-band offset compensation is needed, the determining may be performed according to only pixels of the first LCU. If sub-band offset compensation needs to be performed, the sub-band offset compensation value is calculated. When it is determined whether edge offset compensation is needed, the determining is performed according to edge pixels of the first LCU, or according to edge pixels of the first LCU and pixels of a second LCU. If edge offset compensation needs to be performed, the edge offset compensation value is calculated. Finally, the compensation parameter of the first LCU is determined.

The second LCU is a previously received LCU adjacent to the first LCU. The second LCU includes one, two, or three LCUs.

Figure 7:
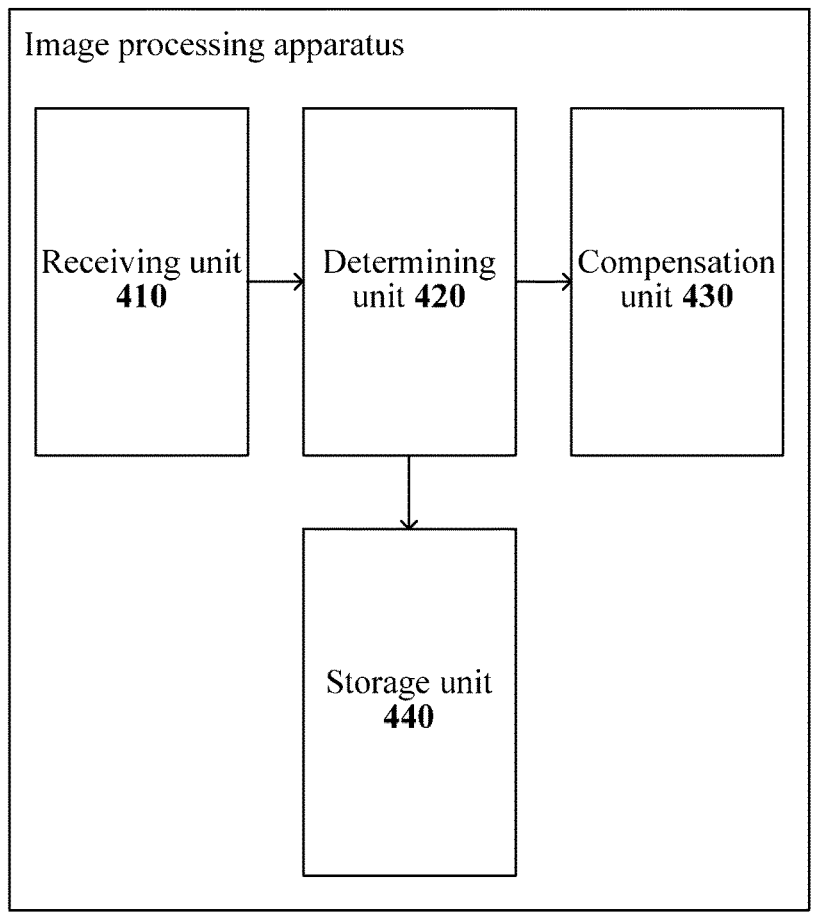
FIG. 7 is another schematic structural diagram of an image processing apparatus according to Embodiment 4 of the present invention.

In addition, as shown in FIG. 7, the image processing apparatus may further include a storage unit 440. The storage unit 440 is configured to store the compensation parameter of the first LCU, so that the compensation parameter is used when pixel compensation is subsequently performed on an area, on which pixel compensation is not performed, of the first LCU.

The compensation unit 430 is configured to perform pixel compensation on at least one area of the first LCU according to the compensation parameter of the first LCU.

If the determined compensation parameter of the first LCU is a sub-band offset compensation parameter, the compensation unit 430 performs pixel compensation on at least one area of the first LCU according to the sub-band offset compensation parameter of the first LCU by using the pixels of the first LCU. If the determined compensation parameter of the first LCU is an edge offset compensation parameter, the compensation unit 430 performs edge offset compensation on at least one area of the first LCU according to the edge offset compensation parameter of the first LCU by using the pixels of the first LCU and the pixels of the second LCU.

The compensation unit 430 is further configured to perform pixel compensation on at least one area of the second LCU according to a compensation parameter of the second LCU.

When the compensation parameter of the second LCU is determined, because the compensation parameter of the second LCU is determined when the second LCU is previously received, and the compensation parameter of the second LCU is stored in the SAO compensator, the stored compensation parameter of the second LCU can be directly used when pixel compensation is performed on the area, on which pixel compensation is not performed, of the second LCU.

If the stored compensation parameter of the second LCU is the sub-band offset compensation parameter, the compensation unit 430 performs sub-band offset compensation on at least one area, on which pixel compensation is not performed, of the second LCU according to the sub-band offset compensation parameter of the second LCU by using the pixels of the second LCU. If the stored compensation parameter of the second LCU is the edge offset compensation parameter, the compensation unit 430 performs edge offset compensation on at least one area, on which pixel compensation is not performed, of the second LCU according to the edge offset compensation parameter of the second LCU by using the pixels of the second LCU and pixels of a received LCU adjacent to the second LCU.

According to the image processing apparatus provided in Embodiment 4 of the present invention, because each LCU of an image includes at least two areas, the image processing apparatus separately performs pixel compensation on at least one area of a current LCU and at least one area, on which pixel compensation is not performed, of a previously received LCU adjacent to the current LCU. Therefore, after a compensation parameter of the current LCU is determined, the image processing apparatus can directly perform, without a latency, pixel compensation on at least one area of the current LCU by using pixels of the current LCU and pixels of the received LCU adjacent to the current LCU; and only an area, on which pixel compensation is not performed, in the received LCU needs to be buffered, which can effectively reduce the amount of buffered data.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc-read-only memory (CD-ROM), or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. An image processing method executed by an image processing apparatus, for processing largest coding units, wherein each largest coding unit comprises at least two areas, wherein the method comprises:
receiving, by the image processing apparatus, a first largest coding unit of an image, wherein the first largest coding unit is a currently received largest coding unit;
determining a compensation parameter of the first largest coding unit according to pixels of the first largest coding unit;
performing first pixel compensation for at least one area of the first largest coding unit according to the compensation parameter of the first largest coding unit;
storing the compensation parameter of the first largest coding unit in memory;
performing second pixel compensation for an area according to the stored compensation parameter of the first largest coding unit, for which pixel compensation is not performed during the first pixel compensation in the first largest coding unit;
obtaining a stored compensation parameter of a second largest coding unit, wherein the second largest coding unit is a previously received largest coding unit adjacent to the first largest coding unit, wherein the stored compensation parameter of the second largest coding unit is determined according to pixels of the second largest coding unit; and
performing third pixel compensation for at least one area, for which pixel compensation is not performed during the second pixel compensation in the second largest coding unit according to the stored compensation parameter of the second largest coding unit.

2. The method according to claim 1, wherein performing the first pixel compensation for the at least one area of the first largest coding unit according to the compensation parameter of the first largest coding unit comprises performing the first pixel compensation for at least one area of the first largest coding unit according to the compensation parameter of the first largest coding unit by using pixels of the first largest coding unit.

3. The method according to claim 1, wherein performing the first pixel compensation for the at least one area of the first largest coding unit according to the compensation parameter of the first largest coding unit comprises performing the first pixel compensation for at least one area of the first largest coding unit according to the compensation parameter of the first largest coding unit by using the pixels of the first largest coding unit and the pixels of the second largest coding unit.

4. The method according to claim 1, wherein performing the third pixel compensation for the at least one area, for which pixel compensation is not performed during the second pixel compensation in the second largest coding unit according to the compensation parameter of the second largest coding unit comprises performing the third pixel compensation for at least one area, for which pixel compensation is not performed, of the second largest coding unit according to the compensation parameter of the second largest coding unit by using the pixels of the second largest coding unit.

5. The method according to claim 1, wherein performing the third pixel compensation for the at least one area, for which pixel compensation is not performed during the second pixel compensation in the second largest coding unit according to the compensation parameter of the second largest coding unit comprises performing the third pixel compensation for at least one area, for which pixel compensation is not performed, of the second largest coding unit according to the compensation parameter of the second largest coding unit by using the pixels of the second largest coding unit and pixels of the first largest coding unit.

6. The method according to claim 1, wherein the image is an image on which deblocking filtering is not performed.

7. The method according to claim 1, wherein the image is an image on which deblocking filtering is performed.

8. An image processing apparatus, for processing largest coding units, wherein each largest coding unit comprises at least two areas, the apparatus comprising:
a receiver implemented by electronic hardware and configured to receive a first largest coding unit of an image, wherein the first largest coding unit is a currently received largest coding unit;
a processor implemented by electronic hardware, coupled to the receiver, and configured to:
determine a compensation parameter of the first largest coding unit according to pixels of the first largest coding unit;
perform first pixel compensation for at least one area of the first largest coding unit according to the compensation parameter of the first largest coding unit; and
a storage medium coupled to the processor and configured to store the compensation parameter of the first largest coding unit; and
wherein the processor is further configured to:
perform second pixel compensation for an area according to the stored compensation parameter of the first largest coding unit, for which pixel compensation is not performed during the first pixel compensation in the first largest coding unit;
obtain a stored compensation parameter of a second largest coding unit of the image, wherein the second largest coding unit is a previously received largest coding unit of the image adjacent to the first largest coding unit of the image, wherein the stored compensation parameter of the second largest coding unit is determined according to pixels of the second largest coding unit; and
perform third pixel compensation for at least one area, for which pixel compensation is not performed during the second pixel compensation in the second largest coding unit according to the stored compensation parameter of the second largest coding unit.

9. The apparatus according to claim 8, wherein the processor is configured to perform the first pixel compensation for at least one area of the first largest coding unit according to the compensation parameter of the first largest coding unit by using the pixels of the first largest coding unit.

10. The apparatus according to claim 8, wherein the processor is configured to perform the first pixel compensation for at least one area of the first largest coding unit according to the compensation parameter of the first largest coding unit by using the pixels of the first largest coding unit and the pixels of the second largest coding unit.

11. The apparatus according to claim 8, wherein the processor is further configured to perform the third pixel compensation for the at least one area, for which pixel compensation is not performed, of a the second largest coding unit according to the compensation parameter of the second largest coding unit by using the pixels of the second largest coding unit.

12. The apparatus according to claim 8, wherein the processor is configured to perform the third pixel compensation for at least one area, for which pixel compensation is not performed, of the second largest coding unit according to the compensation parameter of the second largest coding unit by using the pixels of the second largest coding unit and pixels of the first largest coding unit.

13. The apparatus according to claim 8, wherein the image is an image on which deblocking filtering is not performed.

14. The apparatus according to claim 8, wherein the image is an image on which deblocking filtering is performed.

15. The method according to claim 1, wherein the third pixel compensation occurs after at least one of the first and second pixel compensations.

16. The method according to claim 1, wherein the third pixel compensation occurs prior to at least one of the first and second pixel compensations.

17. The apparatus according to claim 8, wherein the third pixel compensation occurs after at least one of the first and second pixel compensations.

18. The apparatus according to claim 8, wherein the third pixel compensation occurs prior to at least one of the first and second pixel compensations.

19. An image processing apparatus, comprising:
a processor; and
a memory coupled to the processor and having processor-readable instructions stored thereon, which when executed cause the processor to implement operations comprising:
receiving a first largest coding unit of an image, wherein the first largest coding unit is a currently received largest coding unit;
determining a compensation parameter of the first largest coding unit according to pixels of the first largest coding unit;
performing first pixel compensation for at least one area of the first largest coding unit according to the compensation parameter of the first largest coding unit;
storing the compensation parameter of the first largest coding unit in memory;
performing second pixel compensation for an area according to the stored compensation parameter of the first largest coding unit, for which pixel compensation is not performed during the first pixel compensation in the first largest coding unit;
obtaining a stored compensation parameter for a second largest coding unit, wherein the second largest coding unit is a previously received largest coding unit of the image adjacent to the first largest coding unit of the image, and wherein the stored compensation parameter of the second largest coding unit is determined according to pixels of the second largest coding unit; and
performing third pixel compensation for at least one area, for which pixel compensation is not performed during the second pixel compensation in the second largest coding unit of the image according to the stored compensation parameter of the second largest coding unit.

20. The apparatus according to claim 19, wherein the operations comprising: performing the first pixel compensation for at least one area of the first largest coding unit according to the compensation parameter of the first largest coding unit by using pixels of the first largest coding unit.

21. The apparatus according to claim 19, wherein the operations comprising: performing the first pixel compensation for at least one area of the first largest coding unit according to the compensation parameter of the first largest coding unit by using the pixels of the first largest coding unit and the pixels of the second largest coding unit.

22. The apparatus according to claim 19, wherein the operations comprising: performing the third pixel compensation for at least one area, for which pixel compensation is not performed, of the second largest coding unit according to the compensation parameter of the second largest coding unit by using the pixels of the second largest coding unit.

23. The apparatus according to claim 19, wherein the operations comprising: performing the third pixel compensation for at least one area, for which pixel compensation is not performed, of the second largest coding unit according to the compensation parameter of the second largest coding unit by using the pixels of the second largest coding unit and pixels of the first largest coding unit.

24. The apparatus according to claim 19, wherein the image is an image for which deblocking filtering is not performed.

25. The apparatus according to claim 19, wherein the image is an image for which deblocking filtering is performed.

26. The apparatus according to claim 19, wherein the third pixel compensation occurs after at least one of the first and second pixel compensations.

27. The apparatus according to claim 19, wherein the third pixel compensation occurs prior to at least one of the first and second pixel compensations.

* * * * *

UNITED STATES PATENT AND TRADEMARK OFFICE
CERTIFICATE OF CORRECTION

PATENT NO. : 10,021,427 B2
APPLICATION NO. : 14/794277
DATED : July 10, 2018
INVENTOR(S) : Guiming Liao, Gang Su and Changcai Lai It is certified that error appears in the above-identified patent and that said Letters Patent is hereby corrected as shown below:

On the Title Page

Item (30), Line 1: "201310250219" should be "201310250219.2"

Page 2, Item (56), Column 2, OTHER PUBLICATIONS, Line 8: "Form" should be "From"

In the Claims

Column 17, Line 10 Claim 11: delete "a"

Signed and Sealed this
Twenty-eighth Day of August, 2018

Andrei Iancu
*Director of the United States Patent and Trademark Office*